United States Patent [19]

Siegeritz

[11] Patent Number: 5,696,839
[45] Date of Patent: Dec. 9, 1997

[54] METHOD AND APPARATUS FOR REPRODUCING AN IMAGE EMPLOYING A TRANSFORMATION OF COLOR SOLIDS

[75] Inventor: Helmut Siegeritz, Kiel, Germany

[73] Assignee: Linotype-Hell AG, Kiel, Germany

[21] Appl. No.: 429,329

[22] Filed: Apr. 26, 1995

Related U.S. Application Data

[63] Continuation-in-part of Ser. No. 224,285, Apr. 7, 1994, abandoned.

[30] Foreign Application Priority Data

Apr. 8, 1993 [DE] Germany ............ 43 11 707.4
Apr. 8, 1993 [DE] Germany ............ 44 09 226.1

[51] Int. Cl.$^6$ .................... G06K 9/46; H04N 1/36
[52] U.S. Cl. .................... 382/162; 382/167; 358/520
[58] Field of Search .................... 382/162, 276, 382/167; 358/518, 520, 523; 395/119, 127

[56] References Cited

U.S. PATENT DOCUMENTS

| | | | |
|---|---|---|---|
| 4,670,780 | 6/1987 | McManus et al. | 358/80 |
| 4,929,978 | 5/1990 | Kanamori et al. | 355/38 |
| 4,941,038 | 7/1990 | Walowit | 358/80 |
| 4,959,711 | 9/1990 | Hung et al. | 358/523 |
| 5,289,295 | 2/1994 | Yumiba et al. | 358/518 |
| 5,311,212 | 5/1994 | Beretta | 345/150 |
| 5,317,426 | 5/1994 | Hoshino | 358/515 |
| 5,416,890 | 5/1995 | Beretta | 395/131 |

FOREIGN PATENT DOCUMENTS

| | | | |
|---|---|---|---|
| 03455 | 4/1923 | Austria . | |
| 0 340 033 A2 | 11/1989 | European Pat. Off. | H04N 1/46 |
| 43 05 693 A1 | 10/1993 | Germany | G06F 15/62 |
| 1 526 500 | 9/1978 | United Kingdom | H04N 1/46 |

*Primary Examiner*—Jose L. Couso
*Assistant Examiner*—Matthew C. Bella

[57] ABSTRACT

A method for the transformation of color solids of different color reproduction processes in color image reproduction, whereby spatial positions of the colors respectively representable in a color reproduction process are defined by a color solid characteristic of the color reproduction processes in a three-dimensional color coordinate system (L, a, b). First, an initial color solid characteristic of an initial process and a target color solid characteristic of a target process are calculated in the color coordinate system (L, a, b). The initial color solid in the color coordinate system (L, a, b) is then distorted. Subsequently, the distorted initial color solid is transformed into a standardized intermediate color solid in a cylindrical color coordinate system (h, p, q) by a first transformation according to a three-dimensional, first transformation rule ($F_1$). A second standardized intermediate color solid is produced in the cylindrical color coordinate system (h, p, q) by imaging the first intermediate color solid onto itself according to a second transformation rule ($F_2$). The standardized intermediate color solid is then back-transformed by a third transformation according to a three-dimensional, third transformation rule ($F_3$) into a target color solid that is characteristic of a second color reproduction process in the color coordinate system (L, a, b), the transformations each respectively occurring by imaging the color solid.

13 Claims, 10 Drawing Sheets

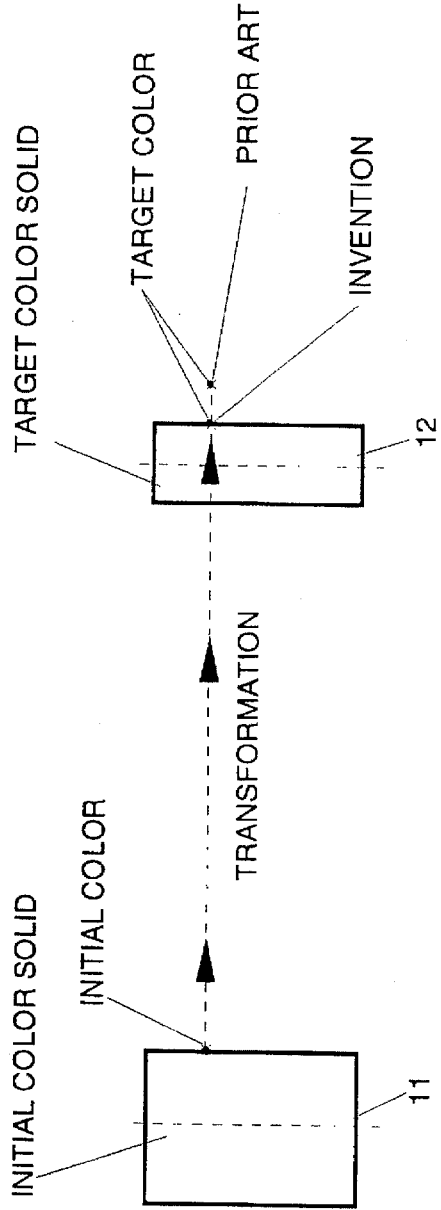
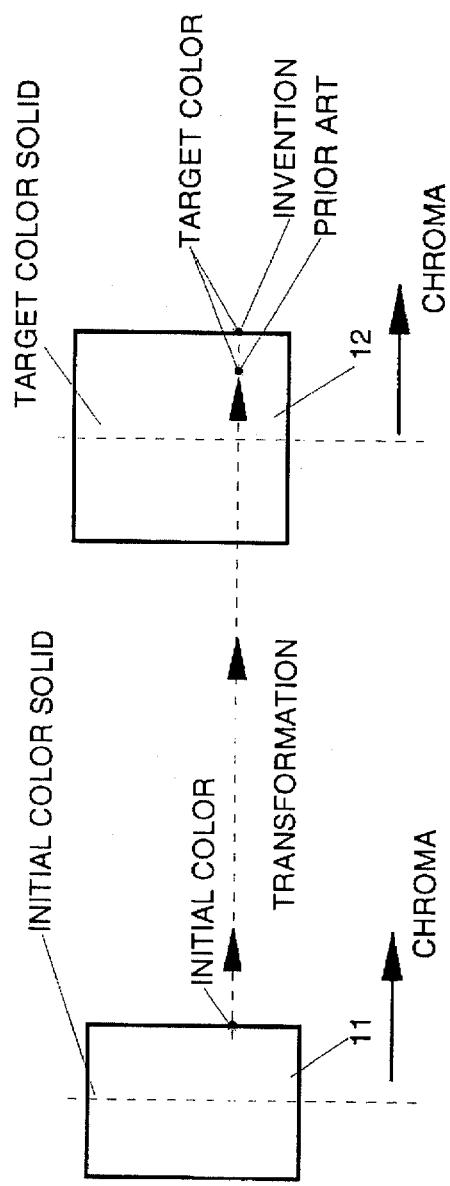
FIG. 3
FIG. 4

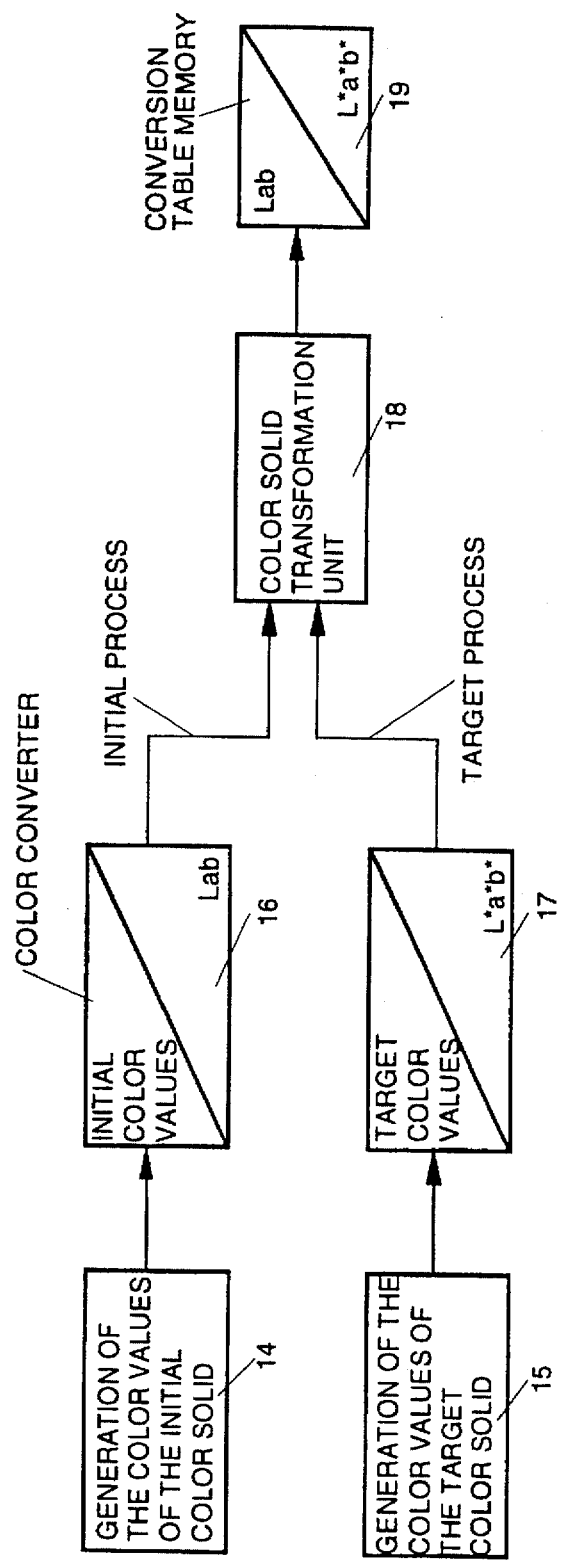
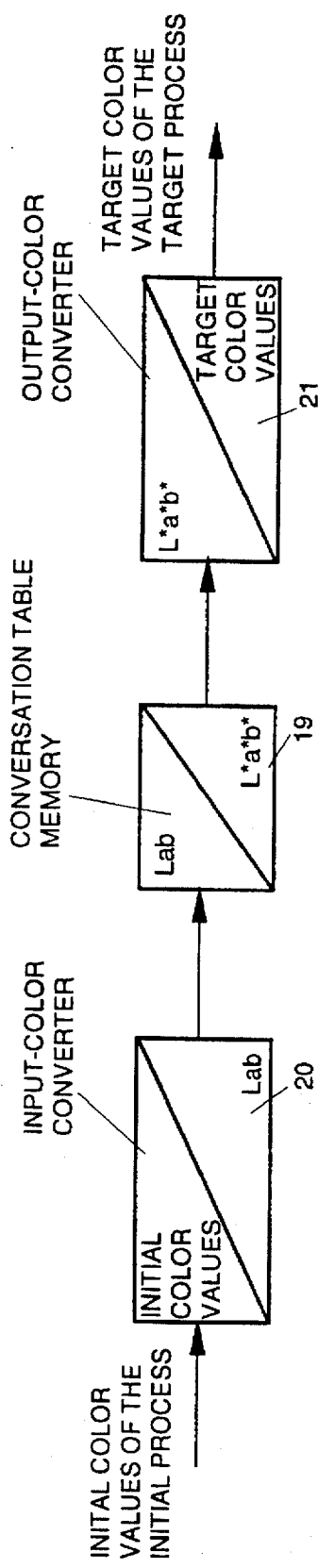
FIG. 5
FIG. 6

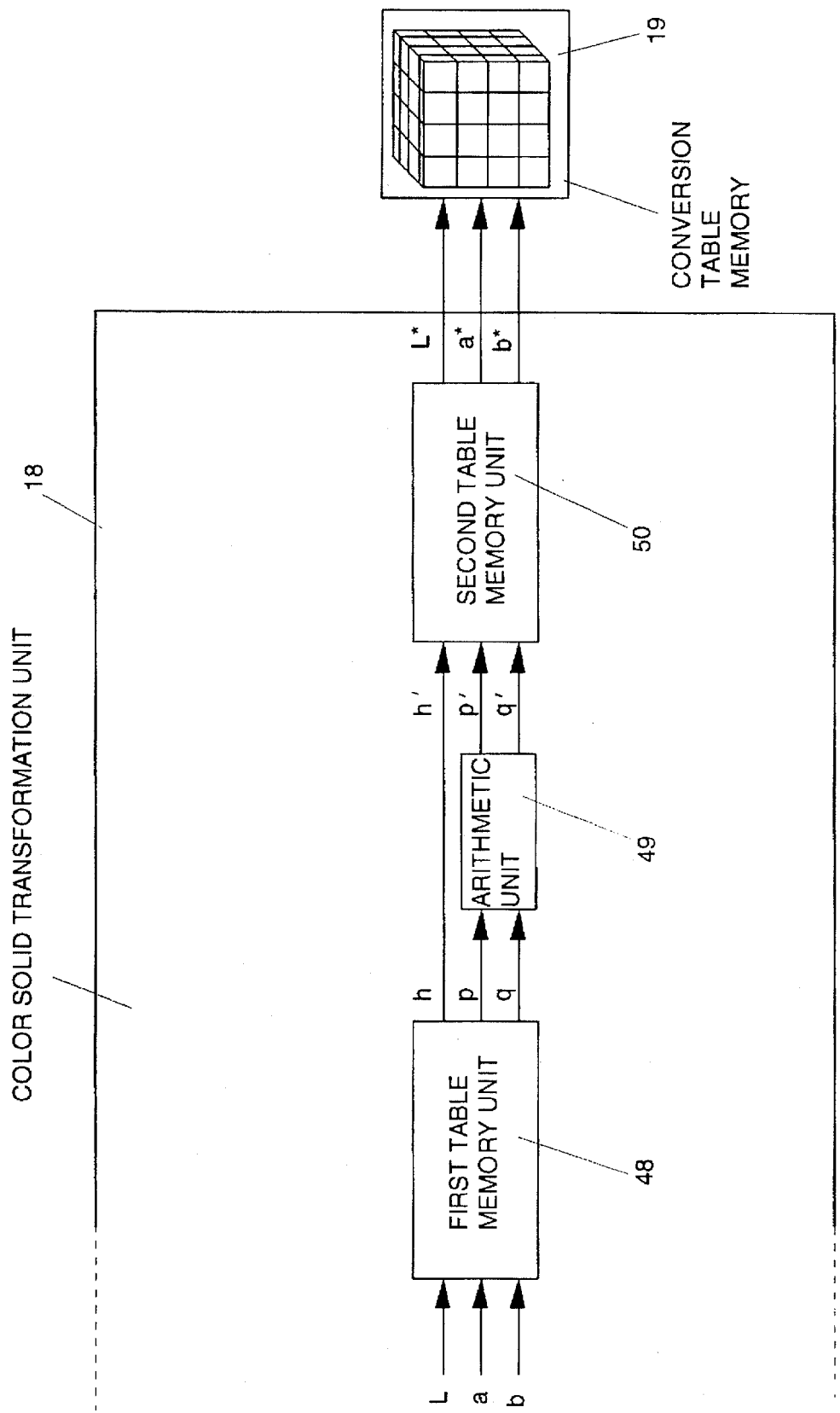

METHOD AND APPARATUS FOR REPRODUCING AN IMAGE EMPLOYING A TRANSFORMATION OF COLOR SOLIDS

RELATED APPLICATION

This application is a continuation-in-part of application Ser. No. 224,285, filed Apr. 7, 1994, now abandoned entitled: "METHOD AND APPARATUS FOR THE TRANSFORMATION OF COLOR SOLIDS" of Helmut Siegeritz.

BACKGROUND OF THE INVENTION

The invention is in the field of electronic color image reproduction and is directed to a method for the transformation of color solids of different color reproduction processes, whereby the spatial position of the colors respectively presentable in a color reproduction process are defined by a color solid in a three-dimensional color coordinate system, this color solid being characteristic of the corresponding color reproduction process. The invention is also directed to an apparatus for the implementation of the method.

There are numerous color reproduction processes in electronic color image reproduction wherein color images can be reproduced, for example four-color offset printing, seven-color printing or reproduction on a color monitor.

Only a specific set of different colors can be presented in each color reproduction process. The sets of all colors of a color reproduction process in a three dimensional color space is referred to as a color solid. In the color reproduction process typical of color image reproduction, the surface of a color solid forms a closed envelope that can be described by a function or by a set of color values. The surface of the color solid limits the reproducible colors lying inside the color solid from the non-reproducible colors lying outside the envelope.

In color image reproduction, a color image is frequently to be reproduced in various color reproduction processes. For that purpose, a transformation of the color solid (initial color solid) of an initial process of the color reproduction process into the corresponding color solid (target color solid) of a target process of the color reproduction process must be implemented according to specific transformation rules.

U.S. Pat. No. 5,185,661, and European EP-A-0 488 655, for example, disclose methods for the conversion of color solids of different color reproduction processes.

The known methods make it possible only to a limited degree to reproduce colors in different color reproduction processes in a qualitatively satisfactory way. This will now be explained in greater detail hereafter.

FIGS. 1 and 2 show two reproduction processes that are standard in practice. FIG. 1 shows a first color reproduction process wherein an original color image to be reproduced is displayed on a color monitor.

The original color image 1 is optoelectronically scanned point-by-point and line-by-line in a scanner 2 in order to obtain the RGB color values. Each triad of RGB color values represents a color of the original color image 1 and presents the three color coordinates of this color in the RGB color coordinate system. The RGB values are converted into rgb drive values for the color monitor 4 in a color converter 3 such that a monitor picture that is identical in color to the original color image 1 is displayed on the picture screen of the color monitor 4. Each monitor color is generated by three rgb drive values. For example, each monitor color is characterized by a triad of XYZ color values that represents the three color coordinates of the monitor color in the XYZ color coordinate system. The XYZ color values are also called standardized norm color values. The XYZ color values can be measured with a color-measuring means (photometer) directly on the picture screen of the color monitor 4.

The color value conversion table rgb=f (RGB) for the color converter 3 contains the corresponding value combinations for all theoretically possible colors and can be calculated in various ways. First, the relationship XYZ=f (RGB) is calculated approximately according to U.S. patent application Ser. No. 043,272 (P-93,0545) equation 8, incorporated herein by reference. The monitor colors are generated on the picture screen and the rgb drive values are varied until the monitor colors have the corresponding XYZ color values. The rgb drive values required for this purpose are measured and allocated to the corresponding RGB color values in table fashion. A color table having all theoretically possible colors can also be employed, the corresponding RGB color values and the corresponding XYZ color values for the individual colors being recited therein. The rgb drive values are again varied until the monitor colors exhibit the corresponding XYZ color values. The rgb drive values required therefor are again measured and allocated to the corresponding RGB color values in table fashion.

FIG. 2 shows a second color reproduction process wherein an original color image 1 is either printed as a color print 8 or output as a proof 10 by proof recorder 9.

The original color image 1 is again scanned in a scanner 2 in order to obtain the RGB color values. The RGB color values are converted into the color separation values in a color computer 5. In three color printing, these are the YMC color values; in four color printing, they are the YMCK color values; and, in seven color printing, they are the YMCK color values and three further color values, for example the RGB color values. Color computers are disclosed, for example, by U.S. Pat. No. 4,285,009 or U.S. Pat. No. 3,885,244, both incorporated herein by reference.

Only four color printing shall be considered below. The YMCK color values are supplied to a color separation recorder 6 that records the four (black/white) color separations 7. The color print 8 is then produced from the four color separations. Alternatively, a recorder 9 is used in proof recording with a proof recorder 9, this producing a color image (color proof 10) instead of the four black/white color separations. Each color in the color print 8 or proof 10 is characterized by four color values Y, M, C and K.

A color reproduction process is characterized by a color solid. A color solid is a three-dimensionally limited space in a color coordinate system. The set of all colors (color values) that lie within or on the surface of the color solid of a color reproduction process can be reproduced in the corresponding color reproduction process; colors lying outside, however, cannot be reproduced. A color solid is defined solely by its surface or envelope. The surface of the color solid can be described by mathematical functions or by the color values of those colors that lie on the surface of the color solid.

There is often the desire in reproduction technology of reproducing a color image in various color reproduction processes (called target processes hereafter). For example, the color image 1 shown on the color monitor 4 according to FIG. 1 should also be printed. The YMCK color values required therefor, however, should not be formed on the basis of another scanning of the color image of FIG. 1, but should be identified from the XYZ color values of the monitor image.

The calculation of the color values required for a target process respectively occurs by transformation of the color solid of the initial process into the color solid of the target process, this being shown in FIG. 8 discussed in greater detail hereafter. The transformation of an initial color solid into a target color solid is also referred to as "gamut mapping". It must be possible to convert the color solid or the color values of an arbitrary initial process into the color solid or color values of an arbitrary target process—for example, the RGB color values into the XYZ color values or the YMCK color values and vice versa.

A reproduction of a color image in another color reproduction process with true colors can only occur when the color solid transformation is optimally error-free. This is the case when all color values of the initial color solid are transformed such that they lie within the target color solid.

Freedom from error is not always assured given the prior art methods for color solid transformation. Two typical errors occurring in the prior art methods are as follows.

A first error can arise in a transformation of color solids such that color images that can be colorimetrically exactly reproduced in a specific color reproduction process are to be reproduced in a different color reproduction process that does not contain all required colors within its color solid. As a result thereof, certain colors are left out of consideration and a diminished reproduction quality results unless further measures are undertaken. More specifically, the first error can arise when colors that lie in the proximity of the surface in the initial color solid 11 shown in FIG. 3 lie outside the target color solid 12 after the transformation. Such colors cannot be reproduced in the target process, as a result whereof the reproduction quality is deteriorated. As a result of the invention, the colors that otherwise lie outside the target color solid 12 are transformed such that they now lie at least on the surface of the target color solid 12, and can thus be reproduced (see FIG. 3).

A second error can occur in the reproduction of color images when specific colors in a color reproduction process lie close to the boundaries of the corresponding color solid, for example have a relatively great saturation. In a colorimetrically exact reproduction of such colors in a different color reproduction process whose obtainable saturation is substantially greater in this region, the result of the reproduction is at a great distance from the boundaries of the color solid. The subjective impression that an inadequate saturation was achieved therefore often arises when viewing the reproduced color image. An exact colorimetric reproduction is thus inexpedient, given such boundary conditions, since a respective viewer always places the color in relationship relative to other colors of the reproduction process that he knows, or relative to the boundaries of the color solid. More specifically, the second error can arise given colors that lie in the proximity of the lateral generated surface of the initial color solid 11 (see FIG. 4) and thus comprise a maximum chroma in the initial process. When the shape of the target color solid 13 (see FIG. 4), is of such a nature that the maximum chroma values are substantially higher than those of the initial color solid, when, thus, the target color solid 13 has a significantly greater lateral expanse, it can occur that the transformed colors do not lie in the proximity of the generated surface of the target color solid 13, but in the middle of the target color solid 13. As a result thereof, the transformed colors in the target process do not have a maximum chroma but only a reduced chrome, which leads to losses of quality. As a result of the invention, the colors that otherwise lie inside the target color solid 13 are transformed such that they now lie on the surface of the target color solid 13 and thus exhibit maximum chroma (see FIG. 4).

In standard color reproduction, there are color images for every color dot of the color reproduction process that contain this dot of the color solid and additionally contain a three-dimensional region in its environment. When such a region is compressed, for example due to truncation onto a two-dimensional surface, then it loses one dimension, and deficiencies in the reproduction arise.

SUMMARY OF THE INVENTION

An object of the present invention is to provide a method and an apparatus for the transformation of color solids of different color reproduction processes such that, with respect to reproduction quality, a perceived color is achieved in the reproduction, wherein the relationships of the colors to one another and to the boundaries of the color solid are taken into consideration.

It is an object of the instant invention to avoid the above described errors in that the spacings of the colors from one another, the spacings of the colors from the surface of the initial color solid and the shape of the surface are taken into consideration in the transformation. This is achieved with the invention since the transformation is implemented with Lab color values, the surface of the color solids is described by drafts of traverse, and the color solid is subdivided into grid networks (see FIGS. 12, 13, and 14).

According to the method of the invention, a transformation of color solids of different color reproduction processes is provided in color image reproduction. A spatial position of the colors presentable in a color reproduction process is defined by a color solid in a three-dimensional color coordinate system that is characteristic of the color reproduction process. An initial color solid characteristic of an initial process of the color reproduction process and a target color solid characteristic of a target process of the color reproduction process are calculated in a sensation-conforming, cartesian color coordinate system (L, a, b). The initial color solid is transformed into a standardized intermediate color solid independent of the color reproduction processes in a cylindrical color coordinate system (h, p, q) by transformation according to a three-dimensional transformation rule [h, p, q=$F_1$(L, a, b)] that governs the initial process. The standardized intermediate color solid is transformed into the target color solid in the sensation-conforming, cartesian color coordinate system (L,a,b) by a back-transformation according to a three-dimensional transformation rule [L*, a*, b*=$F_3$(h, p, q)] that governs the target process of the reproduction process, whereby the transformation respectively occurs by imaging the color solids.

The method of the invention makes it possible to not undertake an orientation relative to single color images, but to treat all color images presentable in a color reproduction process, and thus the entire color solid, at the same time. However, the treatment of individual color images is also possible on the basis of this global procedure. In particular, it is possible to define a sub-process for each color image whose color solid is matched to the respective color image.

In the transition from an initial process to a target process, the color solid of the target process is advantageously completely utilized. This means that each color from the target process is the target point of the imaging of a color from the initial process. The universal applicability results therefrom that the method of the invention is in the position of handling all color reproduction processes merely on the basis of the description of the surfaces of initial color solids and target color solids in the standardized chromaticity system or in a color coordinate system derived therefrom, for example in the Lab color coordinate system. No process-specific color coordinate systems and no information about the type of color reproduction process (color printing; color monitor) are fundamentally required.

Even without interaction with a respective user, the method of the invention delivers good reproduction results. This, however, does not preclude additional possibilities of involvement for the user.

A further advantage of the method of the invention is that complicated distortions in the sensation-conforming L, a, b color coordinate system can be greatly simplified by a transformation into the cylindrical h,p,q color coordinate system. For example, a final saturation of all colors can already be achieved on the basis of extremely simple calculations given adherence to the limits to the color solids in the h, p, q color space, even though a closed solutility is not established in the L, a, b color space.

BRIEF DESCRIPTION OF THE DRAWINGS

FIGS. 3 and 4 illustrate a comparison of the invention and the prior art with respect to placement of target colors in a target color solid;

FIGS. 5 and 6 illustrate in block diagram format the method and apparatus of the present invention;

FIGS. 15A, 15B, and 15C show a fundamental block circuit diagram of the color solid transformation unit 18 and conversion table memory 19 employed in the method of the invention.

DESCRIPTION OF THE PREFERRED EMBODIMENTS

Figure 1:
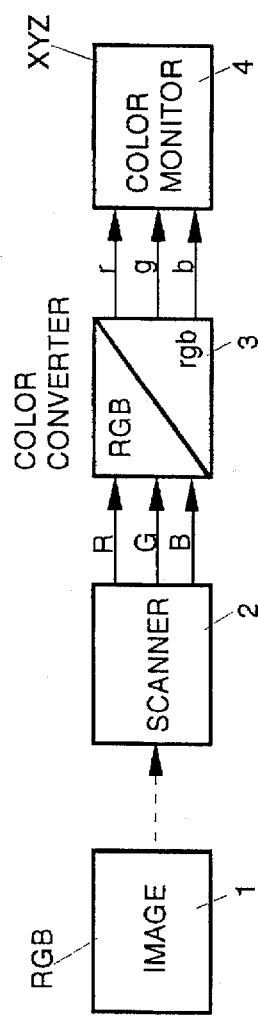
FIGS. 1 and 2 illustrate prior art reproduction processes for scanning an image and displaying that image on a color monitor or as a color print or color proof, the present invention as shown in FIGS. 5 and 6 being applied to these prior art systems as explained hereafter.

The inventive transformation method for the color solids is implemented with the following steps:

1) calculating the color values for the description of the initial color solid of the initial process;

2) calculating the color values for the description of the target color solid of the target process;

3) transforming the color values of the initial color solid into Lab color values;

4) transforming the color values of the target color solid into L*a*b* color values;

5) calculating the transformation table L*a*b*=f(Lab); and 6) converting the Lab color values of a color image of the initial process into the L*a*b* color values of the target process in which the color image is to be reproduced according to the transformation table L*a*b*=f(Lab) calculated in step 5), and then reproducing the color image in the target process.

FIG. 5 shows the fundamental block circuit diagram for the implementation of steps 1) through 5).

The calculation of the color values for the description of the initial color solid of the initial process according to step 1) occurs in block 14.

The calculation of the color values for the description of the target color solid of the target process according to step 2) occurs in block 15.

The transformation of the color values of the initial color solid into Lab color values of the LAB color coordinate system according to step 3) occurs in the color value converter 16.

The transformation of the color values of the target color solid into L*a*b* color values of the LAB color coordinate system according to step 4) occurs in the color value converter 17.

The calculation of the transformation table L*a*b*=f(Lab) according to step 5) occurs in the color transformation unit 18.

The transformation table 19 is loaded with the color values calculated in the color transformation unit 18.

FIG. 6 shows the employment of the transformation table 19 in a reproduction line according to step 6). An input color converter 20 that converts the color values of the color image to be reproduced in the initial process into the input color values Lab for the transformation table 19 is connected preceding the transformation table 19. A following output color converter 21 converts the output color values L*a*b* of the transformation table 14 into the corresponding color values of the target process. This circuit combination is inserted into the reproduction line shown in prior art FIGS. 1 or 2 prior to the color monitor 4 of FIG. 1 or prior to the separating recorder 6 or proof recorder 9 shown in FIG. 2. An appropriate output color converter 16 is disclosed, for example, in U.S. patent application Ser. No. 043,272 (P93, 0545), incorporated herein by reference.

Details about steps 1) through 5) that relate to the actual invention will now be set forth.

Steps 1) through 4)

To calculate the color values for various color reproduction processes (initial process and target process) in blocks 14, 15 of FIG. 5, the following is noted.

An original color image 22 (See FIG. 7A) is produced by a photographic method. According to the above definition of a color solid, the color solid of the photographic reproduction process contains all colors that can be theoretically reproduced in a color image by the photographic method. For defining the corresponding color solid in the RGB color coordinate system, it is therefore not only the color image to be respectively reproduced but a plurality of color images having optimally different color gamuts that must be colorimetrically measured with a photometer or be scanned with a scanner in order to identify an optimally great plurality of theoretically possible RGB color values within the color solid. A clear distinction must be made between the color images that are used for the calculation of a color solid and the respective color image that is to be reproduced in target processes.

Figure 7A:
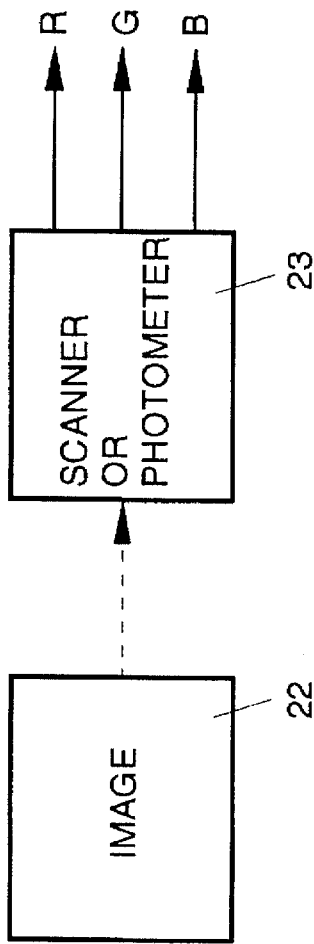
FIGS. 7a, 7b and 7c show three exemplary embodiments for the blocks 14, 15 shown in FIG. 5.

A first exemplary embodiment for the blocks 14, 15 of FIG. 5 is shown in FIG. 7A for the above-described case. Color images 22 are measured with a scanner or photometer 23 in order to acquire the RGB color values for the description of an initial color solid or of the target color solid.

According to FIG. 1, one color reproduction process employed as part of the present invention is the presentation of a color image on a color monitor 4. The color solid of the reproduction process in the XYZ color coordinate system can be calculated, for example, by colorimetric measurement of the XYZ color values of an optimally great plurality of colors that can be theoretically displayed on the color monitor with a photometer.

Figure 7B:
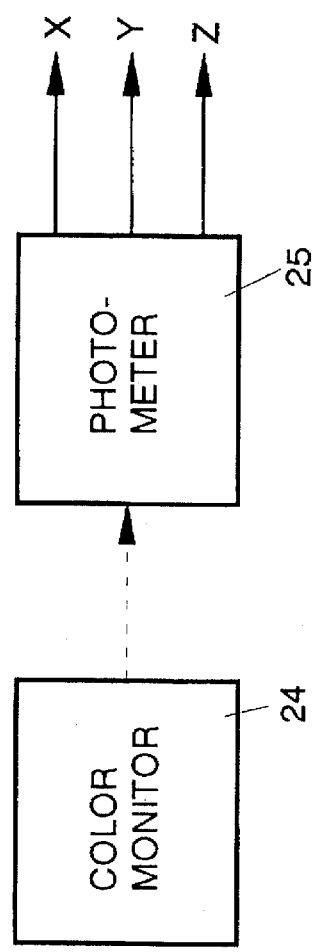

A second exemplary embodiment of the blocks 14, 15 of FIG. 5 is shown in FIG. 7B for this case. The monitor colors generated on the color monitor 24 (reference numeral 4 in FIG. 1) are measured with a photometer 25 in order to acquire the XYZ color values for the description of an initial color solid or of a target color solid.

Figure 2:
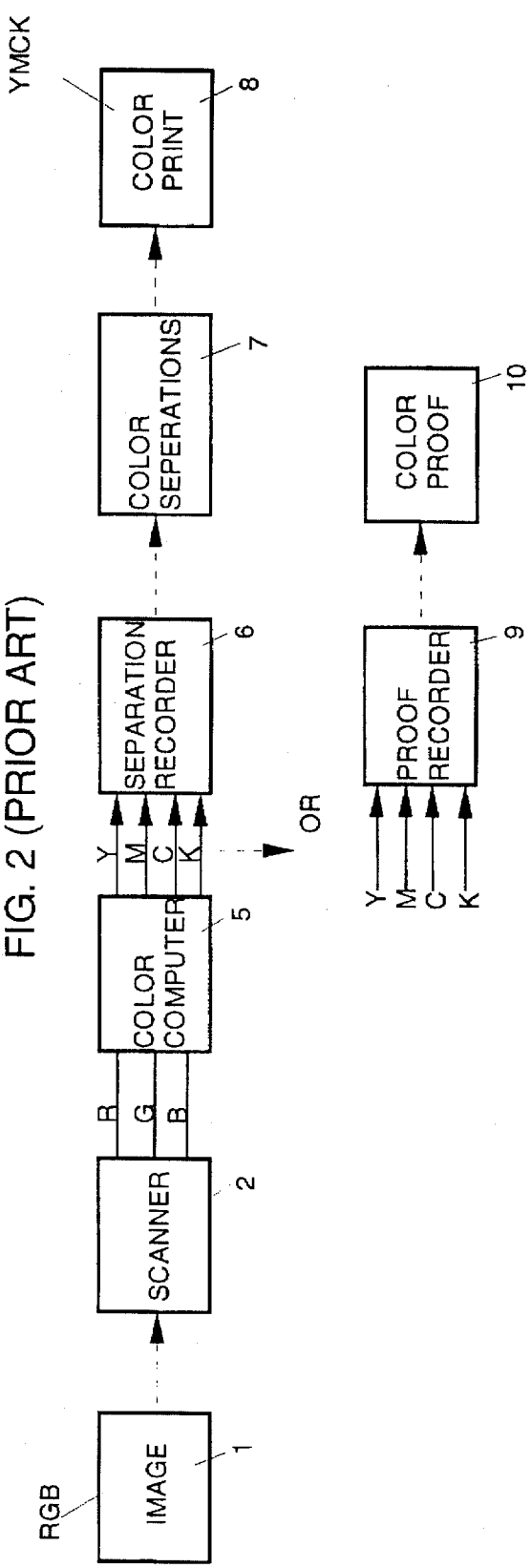

Another reproduction process employed in the present invention is the creation of color print 8 or the creation of the color proof 10 of FIG. 2. The corresponding color solid of the printing or proofing process is defined, for example, by measuring the YMCK color values or, respectively, the XYZ color values of a printed color table that contains optimally all colors that can be theoretically reproduced in printing.

Figure 7C:
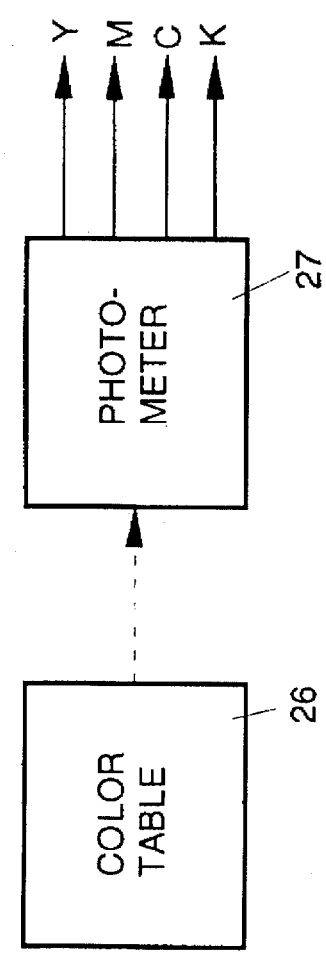

A third exemplary embodiment of the blocks 14, 15 of FIG. 5 is shown in FIG. 7c for this case. A printed color table 26 is measured with a photometer 27 in order to obtain YMCK color values for the description of an initial color solid or of a target color solid.

The measured color values are subsequently converted in the color converter 16 or the color converter 17 into the input color values for the color transformation unit 18 of FIG. 5.

As already mentioned above, a color solid can be advantageously described only by the colors on its surface. It is therefore adequate in steps 1) and 2) to only measure the colors on the surface, this representing a significant simplification. Colors on the surface of a color solid are characterized in that at least one of the three color values has the value 0% or 100%. The colors to be measured will then be selected according to these specific color values.

Figure 8:
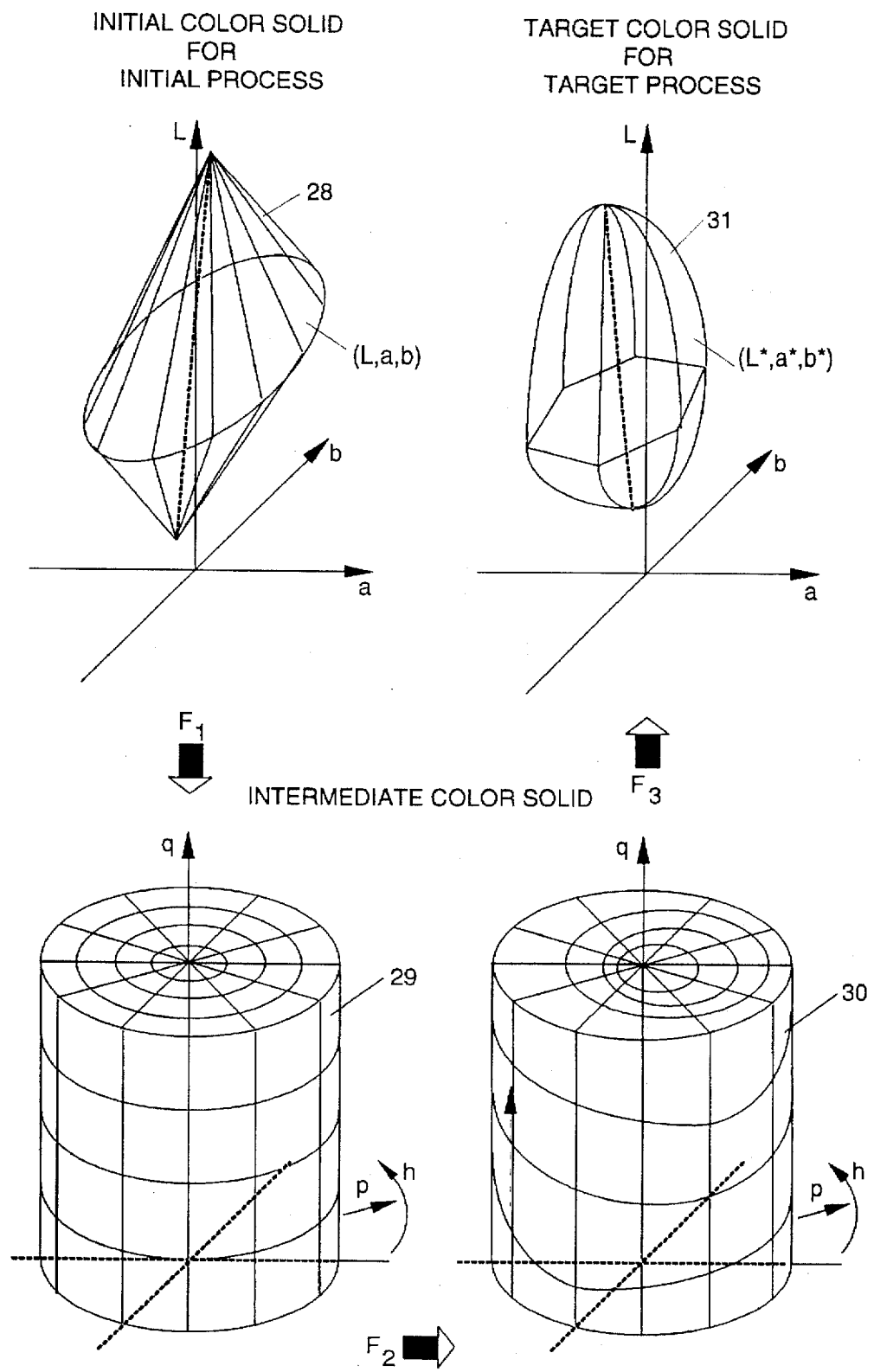
FIG. 8 is an illustration for explaining the principles of the method of the invention and shows an initial color solid for an initial process and a target color solid for a target process for color reproduction.

The method of the invention will now be described in greater detail in the following drawing Figures, beginning with FIG. 8. An initial color solid 28 (See FIG. 8) that is defined in a sensation-conforming, cartesian L, a, b color coordinate system by the color coordinates L, a and b and characterizes an initial process of the color reproduction process is converted into a standardized, cylindrical, first intermediate color solid 29 in the form of a unit cylinder having a height 1 and a radius 1 in a cylindrical h, p, q color coordinate system. It is converted there into by a transformation according to a three-dimensional, first transformation rule $F_1$ that governs the initial process. The surface of the initial color solid 28 with the exception of the points of minimum and maximum luminance—is thereby steadily and reversibly imaged onto the generated surface of the intermediate color solid 29, and the interior of the initial color solid 28 is correspondingly steadily and reversibly imaged onto the interior of the intermediate color solid 29.

The first transformation rule $F_1$ reads:

$$h, p, q = F_1(L, a, b).$$

In order to improve the reproduction quality, a second intermediate color solid 30 is advantageously produced in the cylindrical h, p, q color coordinate system by imaging the first intermediate color solid 29 onto itself according to a second transformation rule $F_2$. A secondary condition for this imaging is that the generated surface, the overlaps, and the interior are each respectively imaged onto themselves, that the imaging is steady, and that the color coordinates h remain unaltered. The second transformation rule $F_2$ rules:

$$p', q' = F_2(p, q) \text{ with } h' = h.$$

The second intermediate color solid 30 having the color coordinates h', p' and q' is then transformed back into a target color solid 31 characteristic of the target process that is defined in the sensation-conforming, cartesian L, a, b color coordinate system by the color coordinates L*, a* and b*. It is transformed thereinto by a back-transformation according to a three-dimensional, third transformation rule $F_3$ that governs the target process. The third transformation rule $F_3$ reads:

$$L^*, a^*, b^* = F_3(h', p', q').$$

The transformations occur by imaging the color solids, i.e. by imaging the surfaces or envelopes, whereby the interior of the color solid is correspondingly co-imaged.

The combined imaging of the initial color solid 28 onto the target color solid 31. occurs via a three-dimensional vector field in the L, a, b color coordinate system whose definition range is the initial color solid 28 and whose value range is the target color solid 31. The points of minimum and maximum luminance $L_{min}$ and $L_{max}$ of the initial color solid 28 and of the target color solid 31 are thereby allocated to one another in order to assure a maximum scope of luminance.

The transformation rules are three-dimensional tables according to which the transformations for the imaging of the color solids are undertaken.

The method steps shall be set forth in detail below.

In a first method step [A], the initial color solid 28 characteristic of the initial process of the color reproduction process and the target color solid 31 characteristic of the target process of the color reproduction process is identified in the sensation-conforming, cartesian L, a, b color coordinate system.

In the color reproduction processes typical of color image reproduction, the surface of a color solid forms a closed envelope that is described by a set of color values. The surface of the color solid limits the reproducible colors lying inside the color solid from the non-reproducible colors lying outside the envelope. The description of the surface of a color solid by color values is obtained, for example, in that a great number of colors that lie on the surface of a color solid are generated, and the color values of the generated colors are colorimetrically measured in the standardized chromaticity system. The plurality and the selection of the colors thereby occurs such that all points of the surface of the color solid have at most a defined color difference from another, measured point. A set of color values that, conforming to sensation, lie approximately uniformly distributed on the surface of the color solid is obtained as the result of the measurements.

Subsequently, the color values are transformed into a cartesian color coordinate system approximately adapted in conformity with sensation, for example into the L, a, b color coordinate system. A color coordinate system matched in conformity to sensation is especially well-suited for interpolation between discrete, sampled points of the surface of color solids. The surfaces of the color solids 28,31 can thereby be approximately reconstructed between respectively neighboring, discrete points with the assistance of a three-dimensional interpolation. The L, a, b color coordinate system adapted in conformity to sensation can be employed not only for reproduction processes with surface colors, but can also be employed for reproduction processes with light colors. Two properties that nearly all color reproduction processes have in common, given a presentation in the L, a, b color coordinate system, can be exploited by the employment of the L, a, b color coordinate system. One of these properties is that a color solid comprises exactly one point of minimum luminance $L_{min}$ and one point of maximum luminance $L_{max}$. These points of minimum and maximum luminance can generally be recognized, based on the shape of the color solid, as significant points, for example as salient corners. In the illustration of FIG. 8, two possible shapes have been assumed, highly schematically, for the initial color solid 28 and for the target color solid 31. Fundamentally, however, it is to be assumed that the shape of the color solids 28, 31 in the L, a, b color coordinate system is extremely irregular and cannot be described by simple geometrical bodies.

The described method step is applied both to the initial color solid 28 as well as to the target color solid 31, in that the color values L, a and b that respectively describe the surfaces of the initial color solid 28 and of the target color solid 31 are calculated and are deposited in memories for further-processing.

As previously discussed, the initial process, for example, can be the point-by-point and the line-by-line, optoelectronic scanning of a color image with a scanner and the target process can be four-color priming. In this case, the color values R, G and B acquired by the scanning are converted into the color values L, a and b of the initial color solid 28 and the color separation values Y, M, C and K are converted into the color values L, a and b of the target color solid 31 in the sensation-conforming, cartesian L, a, b color coordinate system.

In a second method step [B], the initial color solid 28 is converted into an intermediate color solid 29 in a cylindrical h, p, q color coordinate system, being converted thereinto according to the three-dimensional, first transformation rule $h,p,q=F_1(L, a, b)$ that governs the initial process. As a result of this transformation, the boundary conditions for the imaging of the initial color solid onto the target color solid are substantially simplified.

The standardized intermediate color solid 29 is a unit cylinder having the radius 1 and the height 1, whereby the points of minimum and maximum luminance $L_{min}$ and $L_{max}$ degenerate to the upper or lower limiting surface of the unit cylinder due to the distortion of the initial color solid 28.

The calculation of the first transformation rule h, p, $q=F_1(L, a, b)$ for the imaging of the initial color solid 28 into the intermediate color solid 29 advantageously occurs in three steps.

Figure 9:
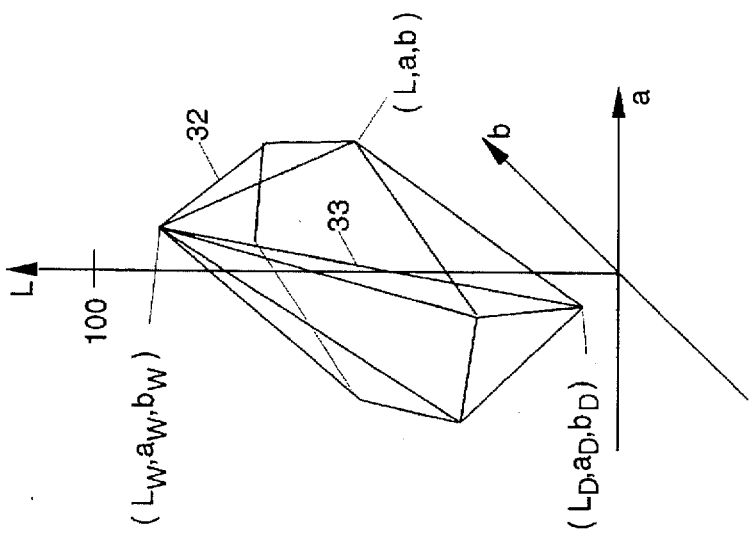
FIG. 9 is an illustration directed to the modification of an initial color solid in the L, a, b color coordinate systems.

As shown in FIG. 9, in a first step, a first sub-rule $F_{11}$ is calculated for a transformation of the initial color solid 28 into a distorted initial color solid 32" (FIG. 11) in the sensation-conforming, cartesian L, a, b color coordinate system by translation, shearing, and expansion. The first sub-rule $F_{11}$ reads:

$$L", a", b"=F_{11}(L, a, b).$$

Figure 11:
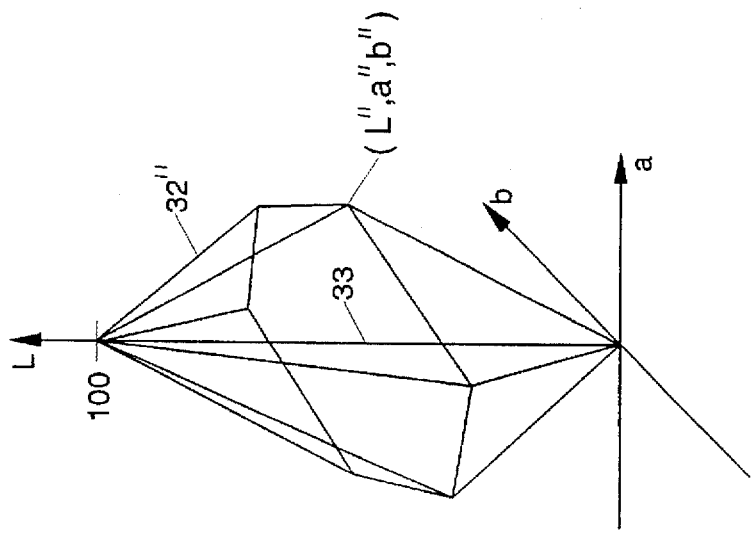
FIG. 11 is another illustration directed to the modification of an initial color solid in the L, a, b color coordinate system.
Figure 10:
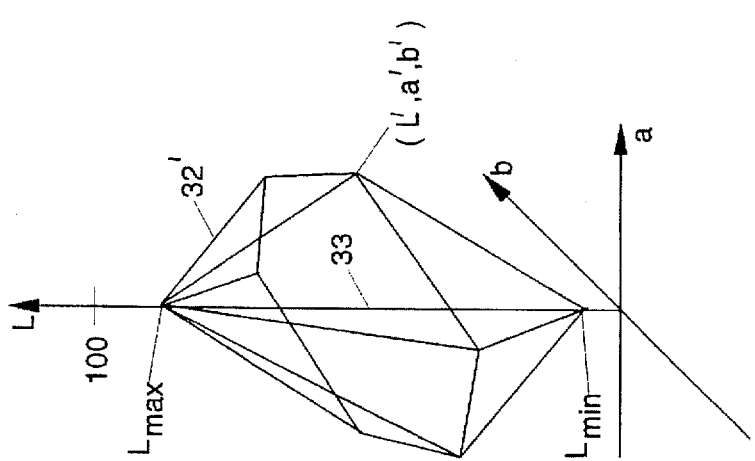
FIG. 10 is a further illustration directed to the modification of an initial solid in the L, a, b color coordinate system.

The conversion is implemented for all available, discrete points of the surface of the initial color solid 32. The conversion rules are shown in FIGS. 9 through 11.

FIG. 9 first shows a simplified illustration of the initial color solid 32 in the L, a, b color coordinate system. Points on the surface of the initial color solid 32 have the color coordinates L, a and b. The point of minimum luminance $L_{min}$ has the color coordinates $L_D$, $a_D$ and $b_D$ and the point of maximum luminance $L_{max}$ has the color coordinates $L_W$, $a_W$ and $b_W$. A gray scale curve is placed between the point of minimum luminance and the point of maximum luminance, this curve defining the course of luminance between the extreme values. In the illustrated example, the gray scale curve is a straight line 33.

The initial color solid 32, upon retention of the luminance values $L_{min}$ and $L_{max}$, is then shifted and sheared in the L, a, b color coordinate system along the a, b plane such that the straight line 33 lies on the L coordinate axis, as a result whereof a distorted initial color solid 32' arises whose surface points are defined by the color coordinates L', a' and b'. The distorted initial color solid 32 is shown in FIG. 10. Translation and shearing occur according to the equations:

$$L'=L$$

$$a'=a+(L-L_D)/(L_W-L_D)*(a_W-a_D)$$

$$b'=b+(L-L_D)/(L_W-L_D)*(b_W-b_D).$$

In case of a curve-shaped path between the points of minimum and maximum luminance, this will be approximated by a set of straight line segments. For that purpose, further points that should lie on the L coordinate axis can be specified next to the points of minimum and maximum luminance. In this case, all recited points are ordered in the direction of the color coordinate L and the color solid is correspondingly subdivided into intervals. The above-recited equations are then applied interval-by-interval.

In most color reproduction processes, the darkest color lies in the proximity of black or dark gray. When one takes the conversion effect of the human eye with respect to a white having a color cast in a color reproduction process, then the distance between the extreme points corresponds to the sensation-conforming gray scale axis in a first approximation. The errors of this approximation can be potentially reduced by employing a modified curve. The modified curve is then converted in the first transformation into the q coordinate axis of the h, p, q color coordinate system.

The distorted initial color solid 32' (FIG. 10) is then distorted again by translation and expansion in the direction of the color coordinate L such that the point of minimum luminance receives the luminance value L"=0 and the point of maximum luminance receives the luminance value L"=100. The point of minimum luminance then has the color coordinates (0, 0, 0) and the point of maximum luminance then has the color coordinates (100, 0, 0). Due to the translation and expansion, the distorted initial color solid 32" arises whose surface points are defined by color coordinates L", a" and b". The distorted initial color solid 32" is shown in FIG. 11. Translation and expansion in the direction of the L coordinate axis occur according to the equations:

$$L"=(L'-L_D)*100/(L_W-L_D)$$

$$a"=a'$$

b"=b'.

In a second step, a second sub-rule $F_{12}$ is calculated for the conversion of the color coordinates L", a" and b" of the sensation-conforming L, a, b color coordinate system into the color coordinates L, S and h of the cylindrical L, S, h color coordinate system, whereby the a, b plane is presented in polar coordinates and the color coordinate L is preserved. The second sub-rule $F_{12}$ therefore reads:

$$h, S = F_{12}(a", b") \text{ with } L = L".$$

The color coordinate S is the hue (color saturation) and the color coordinate h is the hue angle. At the same time, the hue angle h is a color coordinate of the h, p, q color coordinate system. It is additionally determined that the hue angle h=0 belongs to the color coordinate L having the saturation S=0. There is the following relationship between the cylindrical coordinates L, S and h and the color coordinates L", a" and b":

$$L = L"$$

$$S = \sqrt{\text{of } a"^2 + b"^2}$$

$$h = \arctan b"/a".$$

After the second step, all discrete points of the surface of the modified initial color solid 32" are present as points having the color coordinates L, S and h for further-processing.

In a third step, the third sub-rule $F_{13}$ for the transformation of the distorted initial color solid 32" into the standardized, cylindrical, first intermediate color solid 29 in the cylindrical h, p, q color coordinate system (FIG. 8) is calculated. The third sub-rule $F_{13}$ reads:

$$(p, q) = F_{13}(S, L) \text{ with } h = \text{constant}.$$

The calculation of the third sub-rule $F_{13}$ occurs by scanning or sampling discrete points of the surface of the distorted initial color solid 32" (FIG. 11) on the basis of a three-dimensional interpolation and by a following, two-dimensional re-parametering.

The following considerations are erected for the sampling of discrete points of the surface of the distorted initial color solid 32" (FIG. 11).

Figures 12, 13, 14:
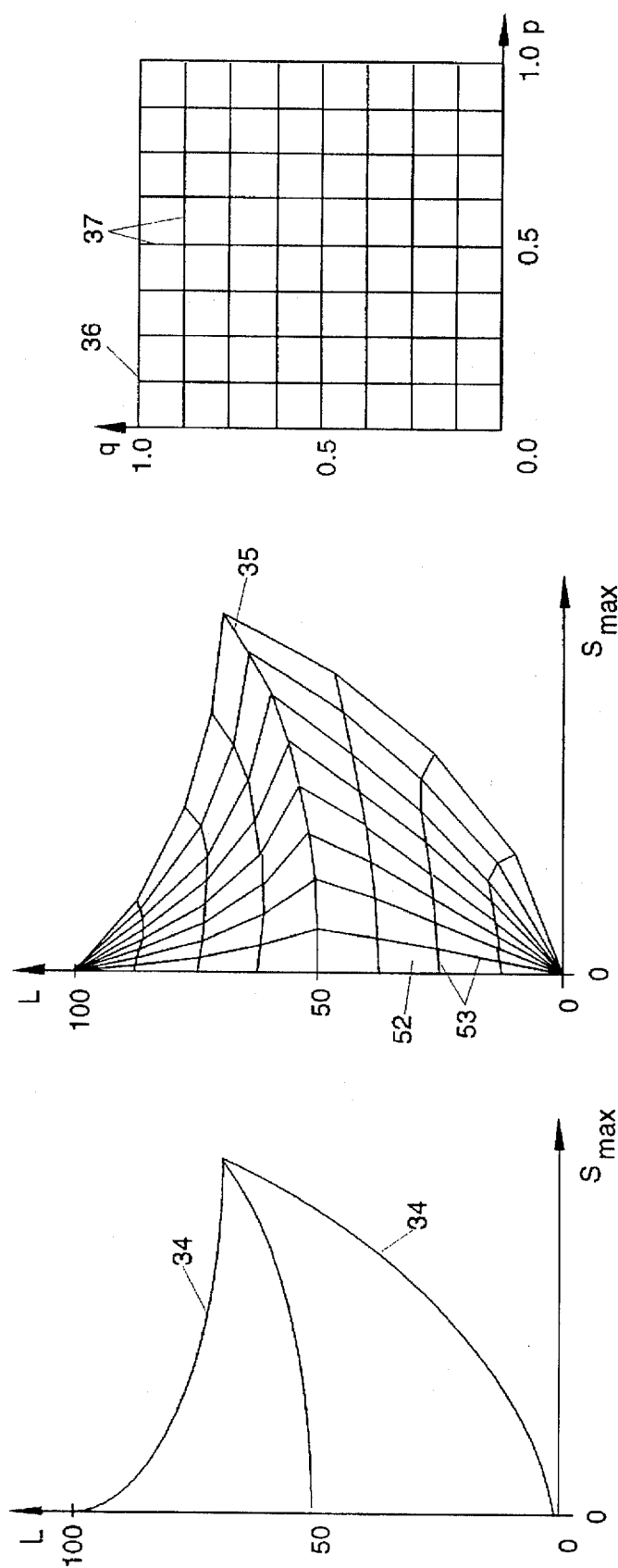
FIG. 12 is a typical curve of a section through a distorted initial color solid in a L, S plane.
FIG. 13 illustrates a sectional surface through a distorted initial color solid in a L, S plane, said sectional surface being subdivided by a grid network.
FIG. 14 illustrates a quadratic, orthogonal grid network in the p, q plane that describes a re-parametering.

As an intersection set of the surface of the distorted initial color solid 32" in the h, S, L color coordinate system and in a half-plane having a hue angle h=constant, a sectional curve 34 (See FIG. 12) arises whose end points on the L coordinate axis have the color coordinates L=0 (point of minimum luminance) and L=100 (point of maximum luminance) given the saturation S=0. FIG. 12 shows an example of such a sectional curve 34 of the initial color solid 32" (FIG. 11).

The sampling of the surface occurs such that the entire circumference of the color coordinates h=2π in the h, S, L color coordinate system is sampled with a plurality n of equidistantly distributed, discrete color coordinates $h_i$, whereby the individual color coordinate values $h_i$ derive in the following way:

$$h_i = i*2\pi/n \text{ for } i=0 \text{ through } i=n-1.$$

As a rule, a plurality of n=256 hue angles $h_i$ proves adequate in standard color reproduction processes. For a discrete hue angle $h_i$, the corresponding sectional curves 34 (FIG. 12) are successively identified as a series of discrete points having the color coordinates S and L. Overall, the entire surface of the distorted initial color solid 32" (FIG. 11) is described by a new set of ordered sampling points that is especially well-suited for interpolations.

In nearly all important color reproduction processes, there is exactly one point having the respectively maximum saturation $S_{max}$ in every sectional curve 34 (FIG. 12). This emphasized point, for example a salient corner, is allocated together with the corresponding points of all other half-planes having respectively constant hue angles h to a special curve that proceeds around the distorted initial color solid 1" (FIG. 11).

The sectional curves 34 (FIG. 12) in the half-planes having constant hue angles h are sub-divided into two curve sections. The subdivision thereby occurs such that a lower curve section extends from the point of minimum luminance (0, 0, 0) up to the point with maximum saturation $S_{max}$, and an upper curve section extends from the point of maximum saturation $S_{max}$ up to the point of maximum luminance (100, 0, 0).

Each curve section is described by a set of straight line segments having sections of equal length. FIG. 13 shows a sectional curve 34 (FIG. 12) through the initial color solid 32" approximated by a set of straight line segments. For simplification, only four sub-distances are respectively shown for the upper and for the lower curve section of the sectional curve 34 (FIG. 12).

A set of points having the color coordinates S and L is then interpolated for each curve section, the spacings of these points being identical.

This procedure can be considered to be a re-parametering of the curve sections corresponding to their curve length. The plurality of individual paths is thereby defined. Given standard transformation sequences, 128 individual paths prove adequate. Deriving overall therefrom is that the complete, newly described sectional curve 34 (FIG. 12) is composed, for example, of 256 individual paths between 257 discrete points.

An additional limitation must be taken into consideration in the production of the set of straight line segments. This limitation is that every curve section should be unambiguous with respect to the color coordinates S. This means that only one corresponding value L exists for a value S. This is assured in most color reproduction processes. When, however, this condition is infringed in specific reproduction processes, then a corresponding variation of the straight line segments must be undertaken in order to assure the acquired unambiguity.

Due to the repeated sampling and the numerical processing of the surface of the initial color solid, deviations can occur in comparison to an ideal, steady surface. For example, it can occur that a point of the L, a, b color space, which still just lies within the initial color solid with respect to the first presentation, lies slightly outside the surface of the modified initial color solid after the implementation of the described sequences. In such cases, the corresponding point can be placed onto the surface of the resulting initial color solid with slight error on the basis of a reduction of the saturation S.

An arbitrary plurality of samples of the distorted surface can be approximately produced by interpolation between the discrete points.

After the sampling by interpolation, the calculated sectional curves or edge curves 34 are stored for the discrete color coordinate values of $h_i$ for further-processing.

After the sampling of the surface of the initial color solid 32" (FIG. 11), a two-dimensional re-parametering subsequently follows for producing a plurality of two-dimensional tables. In addition to points on the surface, points in the inside of the initial color solid 32" are also utilized as supporting points for the two-dimensional re-parametering.

The two-dimensional re-parametering shall be set forth in reference to FIGS. 13 and 14.

As shown in FIG. 13, a half-plane having the color coordinate h=constant forms a sectional surface 52 through the distorted initial color solid 32" in the L, S, h color coordinate system. The sectional surface 52 is limited by the sectional curve 7 or by the corresponding sets of straight line segments as well as by the L coordinate axis between the points of minimum and maximum luminance having the color coordinates S=0 and L=0 as well as S=0 and L=100.

For calculating a supporting framework for a three-dimensional interpolation calculation, a grid network 53 is placed through the sectional surface 52. The intersections of the network lines have the color coordinates (L, S). The value range for the color coordinate L is from 0 through 100 and is from 0 through $S_{max}$ for the color coordinate S.

FIG. 14 shows a corresponding sectional surface 36 (p, q plane) through the standardized intermediate color solid 29 (FIG. 8) in the h, p, q color coordinate system. A quadratic, orthogonal grid network 12 is placed through the sectional surface 36. The intersections of the network lines have the color coordinates p and q.

For calculating the third sub-rule (h, p, q)=$F_{13}$(h, S, L) with h=constant, a color coordinate pair L and S in the L, S, h color coordinate system is first allocated according to the relationship h, S, L=$F'_{13}$ (h, p, q) to every point p and q of the p, q plane of the h, p, q color coordinate system by the two-dimensional re-parametering of the color coordinates L and S to the color coordinates p and q, this being initially stored as an intermediate result.

In detail, the two-dimensional re-parametering sequences as described hereafter.

As shown in FIG. 13, the sectional surface 52 is divided into an upper and into a lower sub-surface by a separating curve 35 that proceeds from the point S=0, L=50 to the point of maximum saturation $S_{max}$. The separating curve 35 is likewise realized by a set of straight line segments that has exactly as many sub-paths as the entire outer sectional curve. According to the above-selected example, 256 sub-paths are thus present.

For constructing the separating curve 13, the sub-paths of the upper and of the lower part of the sectional curves 34 are first respectively ordered in both directions of the color coordinate S. One thereby proceeds from the point having the maximum saturation. Every sub-path has that acute angle that it describes with the negative S coordinate axis allocated to it. Two sequences of angles result therefrom. A new sequence of angles is formed as the arithmetic mean of the first two sequences. The new sequence is composed, for example, of 128 elements. Proceeding from the point having the maximum saturation, a set of straight line segments having a plurality of paths of equal size is constructed. The paths each respectively have a constant length and are respectively joined to one another at the angles of the new angular sequence. The constant length is thereby selected such that the last point lies on the L coordinate axis. The set of straight line segments thereby arising is subsequently viewed in a positive direction of the color coordinate S as a sequence of points S and L. The first point thereby lies on the L coordinate axis and the last point corresponds to the value having the maximum saturation. The first point of the new set of straight line segments does not have the value L=50 in the color coordinate L but has a different value $L_a$. A correction in the direction of the color coordinate L is therefore undertaken with a compensation function $L_K$ (S), in that a correction value $L_K$ that derives as follows from the color coordinate S is added to the value L of every point:

$$L_K = (50 - L_a) * (1 - S/S_{max}).$$

The modified set of straight line segments is newly sampled after the implementation of this correction. This occurs such that it is composed of the required plurality of paths of equal length after the sampling. In the example under discussion, once again a plurality of 256 paths are provided. Corresponding to the example in FIG. 13, a separating line 35 having discrete supporting points is specified for a set of straight line segments, this being composed of 8 segments.

In the parametering of the sectional surface 52 (FIG. 13), the lower and the upper part are treated separately, and the handling thereby respectively occurs according to the same method. The parametering of the lower half shall be set forth in greater detail below. The steps that are set forth are to be applied in mirror-symmetrical fashion for the upper half.

For the lower half, the lower part of the outer sectional curve or edge curve 34 proceeding from the point having the color coordinates S=0 and L=0 is first interpreted as a sequence of directed paths of equal length attached to one another. Each path has the angle allocated to it by which it must be rotated in a clockwise direction so that it lies parallel to the L coordinate axis and isodirectionally relative thereto. The angles form a sequence W (n) of angular values, whereby n, for example, lies between 1 and 128. By multiplying the individual values of the sequence W (n) of angles by a constant factor k, a family of sequences $W_k$ (n) having the form:

$$W_k(n) = k * W(n)$$

arises. This family of sequences $W_k$(n) corresponds to a family of new sets of straight line segments that begin in the point having the color coordinates S=0 and L=0. The end point of the sets of straight line segments migrates through the S, L plane with a variable factor k. Each of these end points can be connected by a straight line to the point (0, 0). An angle u by which the straight line is rotated relative to the L coordinate axis belongs to every value of the factor k. The constant length of the sub-paths of the set of straight line segments can be modified without the angle u changing.

Every discrete point of the separating curve 35 (FIG. 13) between the two parts of the sectional surface 52 can be connected to the point (0, 0) by a straight line in accordance with this procedure. An angle v correspondingly belongs to each of these connections. The value of the factor k of an angular sequence is defined such that v=u applies. Subsequently, the path length can be defined such that the end point of the set of straight line segments coincides with the discrete point of the separating curve 35.

This procedure is implemented for every supporting point of the separating curve 35. The implementation respectively occurs in the upper and in the lower part of the sectional surface 52 for the respective part of the sectional curve 34. The ordered grid network 53, which is shown in FIG. 13, thereby arises through the supporting points of all sets of straight line segments. Each supporting part of the separating curve 35 is an end point of sets of straight line segments.

The one of the sets of straight line segments derives from the lower and the other derives from the upper part of the sectional surface 52. The sets of straight line segments are then respectively combined to form a single set of straight line segments that begins in the point (0, 0) and ends in the point (0, 100). This set of straight line segments is steadily arranged with the constant value p in the p, q plane of the h, p, q color coordinate system of a path. The starting point thereby lies at q=0 and the end point lies at q=1. The total of 256 paths of the polygon in the selected example corresponds to 256 intervals of equal width in the direction of q. The 256 paths of the separating line 13 are allocated with the same procedure to the path between p=0 and p=1 given q=0.5. Overall, the quadratic, orthogonal grid network 37 that is shown in FIG. 14 arises in the p, q plane. The points having the color coordinates S=0 and L=0 and color coordinates S=0 and L=100 are thereby transformed into path lines or passes. 256×256 finite elements in the p, q plane are defined in the afore-mentioned way for every value h with the described re-parametering. After the definition of these finite elements, the storing of the table h, S, L=$F_{13}$ (h, p, q) occurs as an intermediate result.

After the re-parametering, for example, the third sub-rule (h, p, q)=$F_{13}$ (h, S, L) can then be iteratively calculated from the stored intermediate result h, S, L=$F_{13}$ (h, p, q) with a search algorithm, and the three-dimensional, first transformation rule h, p, q=$f_1$ (L, a, b) for the transformation can be acquired by combining all three sub-rules.

Preferably, the first transformation rule h, p, q=$F_1$ (L, a, b) is calculated in the following way from the stored intermediate result according to the transformation rule h, S, L=$F_{13}$ (h, p, q).

First, the color coordinates S and h of the cylindrical h, S, L color coordinate system from the intermediate result are converted—upon retention of the color coordinate L—into the color coordinates L", a" and b" of the cartesian L, a, b color coordinate system according to the transformation rule $$a", b"=F'_{12} (h, S) \text{ with } L"=L,$$

and the color coordinates L, a and b are then acquired from the converted color coordinates L", a" and b" according to a further transformation rule $F_{11}$ by inverse shearing and expansion according to FIGS. 9 through 11. The transformation rule $F_{11}$ reads:

$$L, a, b=F_{11} (L", a", b").$$

By combining the three transformation rules $F_{11}$, $F_{12}$ and $F_{13}$, the inverse, first transformation rule $F'_1$ then derives as:

$$L, a, b=F'_1(h, p, q).$$

The first transformation of the initial color solid 28 into the first intermediate color solid 29 (FIG. 8) according to the first transformation rule $F_1$ then occurs on the basis of the inverse transformation rule $F'_1$ iteratively with a search algorithm that defines a value triad (L, a, b) such that a required value triad (h, p, q) can be allocated thereto, a three-dimensional interpolation being likewise employed for this purpose.

In a third method step, [C], the second intermediate color solid 30 (FIG. 8) having the color coordinates h', p' and q' is produced in the cylindrical h, p, q color coordinate system with a standard imaging (distortion) of the first intermediate color solid 29 (FIG. 8) with the color coordinates h, p and q onto itself according to the second transformation rule $F_2$, which reads:

$$p', q'=F_2 (p, q) \text{ with } h'=h.$$

The standard imaging occurs upon retention of the color coordinates h. The constancy of the color coordinates h in the h, p, q color coordinate system denotes h'=h and (p', q')=F(h, p, q), whereby (h, p, q) is the antecedent or pre-image and (h', p', q') is the image of a point. The imaging can therefore be interpreted as a set of two-dimensional imaging in the color coordinates p and q, each of these being valid for a value h.

The standard imaging occurs taking the geometrical properties of initial color solid and target color solid into consideration. The properties of the two-dimensionally distorting functions are thereby defined from the transformation rules or from the stored tables for the transformation and back-transformation. For that purpose, a plurality of characteristic quantities is calculated for every color solid in the L, a, b color coordinate system that are transformed into the h, p, q color coordinate system and define the two-dimensional distortion function therein.

The standard imaging, which is always applied when no specific algorithms of the user are applied, leads to a distortion in the p, q unit square that is only one-dimensional. This means that the respective color coordinate q remains the same and only a variation of the color coordinate p occurs (p'=$F_2$ (p) and q'=q).

The distortion function $F_2$ (p) for the color coordinate p is thereby a hyperbola whose parameters are calculated for every value of h from a comparison of two specific points. For this purpose, and the quotient M of the maximum saturation $S_{Amax}$ of the initial color solid 1 and $S_{Zmax}$ of the target color solid 4 is defined for the respective value of h as follows:

$$M=S_{Amax}/S_{Zmax}.$$

The distortion function $F_2$ (p) derives as:

$F_2(p)=w+u/(p+v)$ with M unequal to 1. Therein, u, v and w are constants having the form:

$$u=-M/(M-1)^2,$$

$$v=1/(M-1) \text{ and}$$

$$w=M/(M-1).$$

F(p)=p is defined for the case M=1. The hyperbola images the interval in the value range from 0<p<1 onto itself steadily and unambiguously. The values p=0 and p=1 thereby remain the same. The inside of the interval is modified to different extents dependent on M. What the hyperbola effects is that the saturation in the proximity of me L coordinate axis changes only a little, but is changed more and more given a greater distance from the L coordinate axis in the transition from the distorted initial color solid of the initial process to the distorted target color solid of the target process.

It is fundamentally possible to provide a possibility for a user of the method to modify the method sequence via a user interface and to replace the standard imaging by other imaging rules. The user can thereby determine the value significance of various criteria that are formulated adapted to sensation. Such criteria, for example, are the preservation of the saturation in the region of the gray scale axis, the preservation of the distinguishability of the colors in the entire color solid, or the preservation of the original luminance. A number of other criteria are also conceivable over and above this. In one realization of the method, a library of different distortion functions can be made available, their selection and their parameters being determined in accordance with the user's prescriptions. Over and above this, the user can add his own criteria or distortion functions. When generating one's own distortion functions, the user must additionally define the corresponding algorithms for the determination of the function parameters. The tables for the transformation and back-transformation that are present for the initial target processes can always be employed as the basis for such additional algorithms.

In a fourth method step [D], the second intermediate color solid 30 (FIG. 8) with the color coordinates h', p' and q' can be back-transformed by back-transformation according to the three-dimensional, third transformation rule $L^*$, $a^*$, $b^* = F_3$ (h',p',q') into the target color solid 31 (FIG. 8) characteristic of the target process of the color reproduction process (target process) in the sensation-conforming, cartesian L, a, b color coordinate system, whereby the third transformation rule $F_3$ formally corresponds to the previously calculated, inverse, first transformation rule L, a, b=$F_1$ (h, p, q), whereby the operations are implemented with the corresponding measuring values of the target process.

In the reproduction of a color image, it would be fundamentally possible with the assistance of the calculated transformation rules to subject every individual picture element as well as the allocated parameters to the individual transformations. Due to the conversion time resulting therefrom, however, it is more expedient to determine a total transformation rule $L^*$, $a^*$, $b^*$=F(L, a, b) in the form of a stored conversion table according to which the initial color solid 28 is directly transformed into the target color solid 31 (FIG. 8).

A quantized sampling or scanning of the initial color solid 28 is carried out for this purpose. The color values L, a and b thereby acquired are then transformed into the color values $L^*$, $a^*$ and $b^*$ according to the three transformation rules $F_1$, $F_2$ and $F_3$ and the transformed color values $L^*$, $a^*$ and $b^*$ are deposited in a table memory addressable by the corresponding color values L, a and b.

Figure 15A:
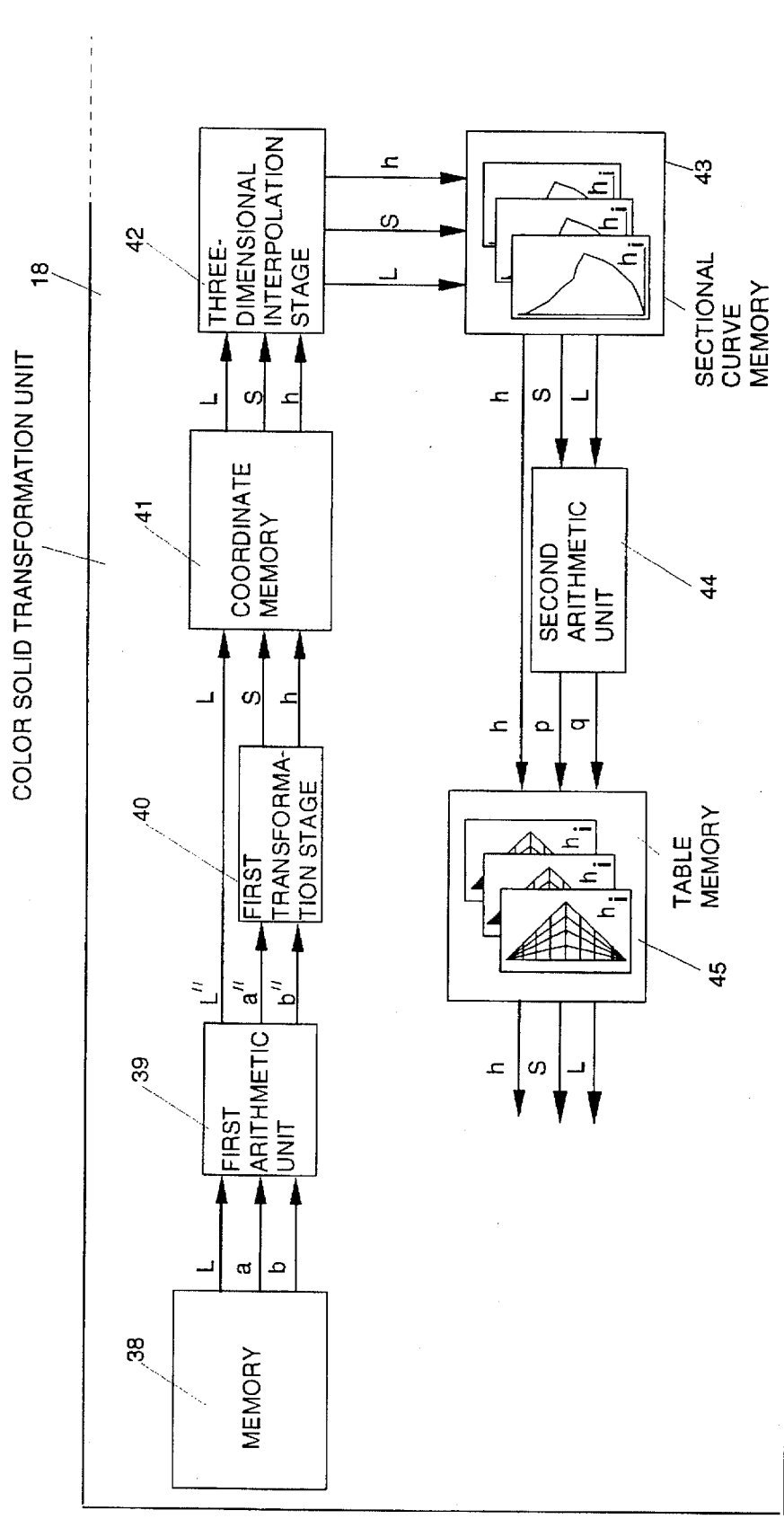

FIGS. 15A, B, C show a schematic block circuit diagram for the color solid transformation unit 18 and conversion table memory 19. In FIG. 15A, the color values L, a and b of the discrete points of the surface of the initial color solid 28 (FIG. 8) are deposited in a memory 38. By expansion and shearing according to FIGS. 9 through 11, the distortion of the initial color solid 32 (FIG. 10) into the color solid 32' (FIG. 10) in which the color coordinates L, a and b are transformed into the color coordinates L", a" and b" according to the sub-rule $F_{11}$ occurs in a first arithmetic unit 39. In the following, first transformation stage 40, the color coordinates L", a" and b" of the distorted surface of the initial color solid 32' (FIG. 10) in the cartesian L, a, b color coordinate system are then transformed into the color coordinates S and h of the cylindrical L, S, h color coordinate system according to the sub-rule $F_{12}$ upon preservation of the color values L, and are deposited in a coordinate memory 41. With the assistance of a three-dimensional interpolation stage 42, the sectional curves or edge curves 34 (FIG. 12) for discrete color coordinates h are calculated according to FIG. 12 from the stored color coordinates L, S and h and the corresponding color coordinates h, S and L are intermediately stored in a sectional curve memory 43. The stored color coordinates S and L, upon preservation of the color coordinates h, are then converted by a two-dimensional re-parametering according to FIGS. 13 and 14 into the color coordinates p and q in a second arithmetic unit 44. The color values h, S and L thereby produced are stored—addressable by the corresponding color values h, p and q—in a table memory 45 as an intermediate result h, S, L=$F_{13}$ (h, p, q) for further-processing.

Figure 15B:
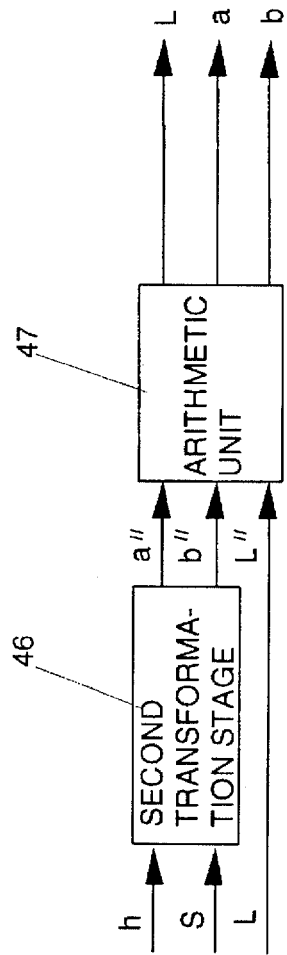

FIG. 15B shows a further processing of the transformation rule h, S, L=$F_{13}$ (h, p, q) stored in the table memory 45 as an intermediate result is further-processed. The color coordinates h, S and L of the cylindrical h, S, L color coordinate system read out from the table memory 45 are converted into the color coordinates L", a" and b" of the L, a, b color coordinate system in a second transformation stage 46, upon preservation of the color coordinates L. These color coordinates L", a" and b" are then transformed into the color coordinates L, a and b in a further arithmetic unit 47 on the basis of a distortion that is inverse compared to the distortion described in FIGS. 9 through 11. The relationship between the input values h, p and q and the output values L, a and b of the circuit arrangement supplies the inverse, first transformation rule L, a, b=$F_1$ (h, p, q) for the imaging of the initial color solid 28 (FIG. 8) into the intermediate color solid 29 (FIG. 8) (transformation, or, respectively, the third transformation rule $L^*$, $a^*$, $b^*$=$F_3$ (h', p', q') for the imaging of the second intermediate color solid 30 into the target color solid 31 (back-transformation).

FIG. 15C shows an overall transformation between the initial color solid 28 and the target color solid 31. The first transformation rule h, p, q=$F_1$ (L, a, b) for the initial process according to which the initial color solid 28 (FIG. 8) is imaged into the first intermediate color solid 29 is stored in a first table memory unit 48. In an arithmetic unit 49, the color coordinates p and q are distorted into the color coordinates p' and q' according to the second transformation p', q'=$F_2$ (p, q), with h'=h, for generating the second intermediate color solid 30 by imaging the first intermediate color solid 29 into itself. The third transformation rule $L^*$, $a^*$, $b^*$=$F_3$(h', p', q') for the target process is stored in a second table memory unit 50 callable by the color coordinates h', p' and q'. The color coordinates L, a and b of the initial color solid 28 are thus converted into the color coordinates $L^*$, $a^*$ and $b^*$ of the target color solid 31 in the units 48, 49, 50 according to the overall transformation rule $L^*$, $a^*$, $b^*$=F(L, a, b), these color coordinates $L^*$, $a^*$ and $b^*$ being then stored in a third table memory unit 51 addressable by the color coordinates L, a and b of the initial color solid 28, whereby the table points that do not lie in the initial color solid are occupied With the next-closest point of the surface, given employment of a cuboid-shaped address space. The color values of the initial process can thereby be directly transformed into the corresponding color values of the target process according to the table deposited in the third table memory unit 51.

Although various minor changes and modifications might be proposed by those skilled in the art, it will be understood that I wish to include within the scope of the patent warranted hereon all such changes and modifications as reasonably come within my contribution to the art.

I claim as my invention:

1. A method for reproducing an image in different color reproduction processes, comprising the steps of:
   measuring a plurality of first initial color values of at least one characteristic image which is representative of an initial color reproduction process, said plurality of first initial color values describing an initial color solid in an initial color coordinate system;
   transforming said plurality of first initial color values of said initial color solid into a plurality of second initial color values of a sensation-conforming Cartesian color coordinate system by a three-dimensional transformation, said plurality of second initial color values describing a transformed initial color solid in said sensation-conforming Cartesian color coordinate system;

measuring a plurality of first target color values of at least one characteristic image which is representative of a color reproduction target process in which the image is to be reproduced, said plurality of first target color values describing a target color solid in a target color coordinate system;

transforming said plurality of first target color values of the target color solid into a plurality of second target color values of a sensation-conforming Cartesian color coordinate system by a three-dimensional transformation, said plurality of second target color values describing a transformed target color solid in said sensation-conforming Cartesian color coordinate system;

in a first mapping step, mapping said transformed initial color solid in said sensation-conforming Cartesian color coordinate system into a standardized intermediate color solid in a cylindrical color coordinate system;

in a second mapping step, mapping said standardized intermediate color solid in said cylindrical color coordinate system into said transformed target color solid in said sensation-conforming Cartesian color coordinate system;

calculating a three-dimensional transformation table from said plurality of second initial color values and said plurality of second target color values in accordance of said first and second mapping steps;

transforming first initial color values of said initial color reproduction image which is to be reproduced in said target reproduction process into a set of second initial color values of the image in said sensation-conforming Cartesian color coordinate system;

converting said set of second initial color values of the image into a set of second target color values of the image by use of said transformation table;

transforming said set of second target color values of the image into first target color values of the image; and reproducing said image in the target reproduction process by using said transformed first target color values.

2. A method according to claim 1 wherein said sensation-conforming cartesian color coordinate system is an LAB-color coordinate system.

3. A method according to claim 1 wherein the first initial color values of said characteristic image of the initial color reproduction process are acquired by scanning a photographic image.

4. A method according to claim 1 wherein the first initial color values of said characteristic image of the initial color reproduction process are acquired by reading a photographic image with a photometer.

5. A method according to claim 1 wherein the first initial color values of said characteristic image of the initial color reproduction process are acquired by reading an image on a color monitor with a photometer.

6. A method according to claim 1 wherein the first initial color values of said characteristic image of the initial color reproduction process are acquired by reading a printed color table.

7. A method according to claim 1 wherein the first target color values of said characteristic image of the target color reproduction process are acquired by scanning a photographic image.

8. A method according to claim 1 wherein the first target color values of said characteristic image of the target color reproduction process are acquired by reading a photographic image with a photometer.

9. A method according to claim 1 wherein the first target color values of said characteristic image of the target color reproduction process are acquired by reading an image on a color monitor with a photometer.

10. A method according to claim 1 wherein the first target values of said characteristic image of the target color reproduction process are acquired by reading a printed color table.

11. A method according to claim 1 including the steps of:
mapping the standardized intermediate color solid in the cylindrical color coordinate system onto itself to create another standardized intermediate color solid in said cylindrical color coordinate system; and
mapping said another standardized intermediate color solid into said transformed target color solid in said sensation-conforming Cartesian coordinate system.

12. A method according to claim 1 including the steps of:
distorting said transformed initial color solid in said sensation-conforming Cartesian color coordinate system by translation, shearing and expansion; and
mapping said distorted initial color solid into said standardized intermediate color solid.

13. A method according to claim 1 including the steps of:
providing the standardized intermediate color solid as a unit cylinder, and
mapping said transformed initial color solid into said unit cylinder in the cylindrical color coordinate system such that a curve between points with standardized luminance values lies on a cylinder axis of said unit cylinder, and points having the standardized luminance values are each respectively mapped onto at least one of entire upper and entire lower overlap surfaces of the unit cylinder.

* * * * *